United States Patent
Rienzo (10) Patent No.: US 6,199,839 B1
(45) Date of Patent: Mar. 13, 2001

(54) VIBRATION DAMPENING MECHANISM

(75) Inventor: Francis Blaise Rienzo, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/211,961

(22) Filed: Dec. 15, 1998

(51) Int. Cl.⁷ .................... H05K 5/02; F16M 1/00
(52) U.S. Cl. ........................... 267/136; 361/685
(58) Field of Search ..................... 267/136, 137, 267/174, 175, 177; 361/685; 360/97.02; 248/638

(56) References Cited

U.S. PATENT DOCUMENTS

| | | | |
|---|---|---|---|
| 5,235,482 | * 8/1993 | Schmitz | 360/97.02 |
| 5,653,070 | * 8/1997 | Seguin | 52/167.1 |
| 5,663,943 | * 9/1997 | Yanagisawa et al. | 369/75.1 |
| 5,673,171 | * 9/1997 | Varghese et al. | 361/685 |
| 5,687,059 | * 11/1997 | Hoppal | 361/685 |
| 5,914,855 | * 6/1999 | Gustafson et al. | 361/685 |
| 5,926,366 | * 7/1999 | Collins et al. | 361/685 |
| 6,002,546 | * 12/1999 | Yagi et al. | 360/97.02 |
| 6,021,041 | * 2/2000 | Ganix et al. | 361/685 |
| 6,028,766 | * 2/2000 | Strickler | 361/685 |
| 6,067,225 | * 5/2000 | Reznikov et al. | 361/685 |
| 6,069,789 | * 5/2000 | Jung | 361/684 |

* cited by examiner

Primary Examiner—Christopher P. Schwartz
(74) Attorney, Agent, or Firm—Brian L. Michaelis, Esq.; Brown Rudnick Freed & Gesmer, PC (57) ABSTRACT

A vibration dampening mechanism which considerably reduces the probability of disk drive failure and ensures vibration damped engagement between a drive carrier and a rack structure. The vibration dampening mechanism includes a torsion spring connected to two movable ramps located on either side of the carrier. The dampener is designed so that the ramps are moved along the sides of the drive carrier as a function of the tolerance between the drive carrier and the rack structure. If the tolerance between the drive carrier and the rack is slight (i.e., the carrier fits tightly in the rack), the ramp is actuated in a first direction to a great extent as it is displaced by the rack's structure. On the other hand, if the tolerance between the drive carrier and the rack is higher (i.e., the carrier fits loosely in the rack), the ramp is actuated in the first direction to a lesser extent so that the ramp effectively decreases the tolerance between the carrier and the rack. This mechanism allows the carriers in the rack to fit along side each other with minimal vibration as the tolerance between carriers and the rack is taken up by the ramps of respective vibration dampening mechanisms.

13 Claims, 6 Drawing Sheets

VIBRATION DAMPENING MECHANISM

FIELD OF THE INVENTION

The present invention relates to computer peripheral devices and more particularly to vibration dampening mechanisms for removable drives and storage systems.

BACKGROUND OF THE INVENTION

Removable hard disk drives are sometimes grouped together into a larger unit or array, such as in Redundant Arrays of Inexpensive Disks (commonly referred to as "RAID systems"). A cast rack with guide rails generally houses the array of hard disk drives. Typical racks may house six rows of disk drives, and each row may contain eight drives arranged horizontally. Each disk drive in the rack is housed in a plastic drive carrier that slides into the rack along a guide rail. Each drive carrier is typically constructed of two substantially symmetrical halves or pieces, each of which has a number of air channel openings. The pieces are fastened together around grooved symmetrical guides.

Unfortunately, these systems face a serious problem with vibration which is a significant cause of disk drive failure. Each hard drive contains a rotating spindle which generates vibrations. The vibrations are not fully absorbed by the carrier. In addition, the construction of the carrier precludes fixing the drive in a manner that eliminates vibration. Furthermore, it is not economically feasible to construct the disk carriers in such a way that they fit together in the cast racks with tolerances tight enough to eliminate the vibration of the carrier within the rack.

Five and a quarter inch disk drives which were previously in use tolerated the vibration well, in part because the higher form factors had lower track and bit densities. However, with the movement towards miniaturization, such as in three and a half inch disk drives, the smaller form factors have higher bit and track densities and are extremely susceptible to vibration. With smaller drives presently in use even slight vibrations cause read and write errors, and substantial vibration(s) may cause disk drive failure.

One implementation aimed at addressing the vibration problem involved compressing a strip of Velcro® between the drive carrier and rack structure. Velcro® is a compressible material that slides with relative ease along the guide rail. This method of dampening vibrations poses several problems. Because it is difficult to fix the Velcro® to the drive carrier, the Velcro® has a tendency to slip out of place as the drive is slid relative to the rack structure. The Velcro® also makes it more difficult for the drive to be inserted because engagement channels on the drive carrier cannot fully engage the guide rail with the Velcro® in place. Furthermore, the Velcro® compresses after a period of time thereby reducing the vibration dampening properties resulting from disposing the compressible material between the drive carriers and the rack structure.

SUMMARY OF THE INVENTION

The present invention provides a vibration dampening mechanism which considerably reduces the probability of disk drive failure and which ensures vibration damped engagement between a drive carrier and a rack structure.

According to the invention, the vibration dampening mechanism comprises a torsion spring connected to two movable ramps located on either side of the carrier. The dampener is designed so that the ramps are moved along the sides of the drive as a function of the tolerance between the drive carrier and the rack structure. If the tolerance between the drive carrier and the rack is slight (i.e., the carrier fits tightly in the rack), the ramp is actuated in a first direction to a great extent as it is displaced by the rack's structure. On the other hand, if the tolerance between the drive carrier and the rack is higher (i.e., the carrier fits loosely in the rack), the ramp is actuated in the first direction to a lesser extent so that the ramp effectively decreases the tolerance between the carrier and the rack. This mechanism allows the carriers in the rack to fit along side each other with minimal vibration as the tolerance between carriers and the rack is taken up by the ramps of respective vibration dampening mechanisms.

In further accord with the invention, the vibration dampening mechanism is implemented in clam shell drive carriers configured with four slide ridges, two mated on each side of the assembled carrier. The dimensions of the ridges are such that each receives a ramp which engages with a respective guide rail on the cast rack. Each of the two substantially identical plastic ramps slides on the slide ridges as a function of the tolerance between the carrier and the respective guide rail on the cast rack. A tapered section of each ramp is dimensioned to fill the maximum possible gap between the drive carrier and the rack. Both ramps on a drive carrier are connected to a single biasing, torsion spring in a manner that substantially prevents the ramps from twisting or moving in an undesirable direction. The torsion spring rests against an abutting surface on the drive carrier.

Features of the invention include mimimized vibration of the disk drives in an array. The dual ramp system effectively eliminates the tolerance in dimensions of the drive carriers and the rack. The ramps are designed to fit on to existing drive carriers with minimal modifications to the drive carrier. They are compact and slide along the slide ridges easily. This makes the insertion of the drive carrier into the chassis easier on the installer. The ramps are connected to an inexpensive torsion spring which is compact enough to fit inside the clam-shell drive carrier. The torsion spring is connected to the ramps in a manner that substantially prevents them from twisting or moving in an undesirable direction, to maintain them in alignment with the guide rail. This also ensures that the whole assembly fits together securely and reduces the possibility of mechanical problems arising with the movable parts. The vibration dampening mechanism is a cost-effective, compact and efficient method of combating the vibration problem in arrays of hard disk drives. By minimizing vibration, the present invention reduces read and write errors and lowers the likelihood of bad sector formation. This enhances the performance of the drives.

BRIEF DESCRIPTION OF THE DRAWING

The foregoing and other features and advantages of the present invention will be more fully understood from the following detailed description of illustrative embodiments, taken in conjunction with the accompanying drawing in which:

FIG. 3b is an enlarged perspective view of the vibration dampening mechanism of FIG. 3a;

FIG. 4b is a an orthographic projection of the movable ramp taken along a line 4b—4b of FIG. 4a;

DETAILED DESCRIPTION

The present invention comprises a drive carrier which is intended to fit into a rack. The rack is typically a cast rack which has a plurality of bays for hard disk drives. The bays are generally arranged in rows stacked up on top of each other. For example, the cast rack shown in FIG. 1, has six horizontal rows each containing eight bays which are vertically stacked. Each bay is typically constructed to have a height of approximately 4.40 inches with a tolerance of ±0.025 inches, a width of approximately 2.25 inches, and a depth of approximately 11 inches for receiving the drive carrier.

Figure 1:
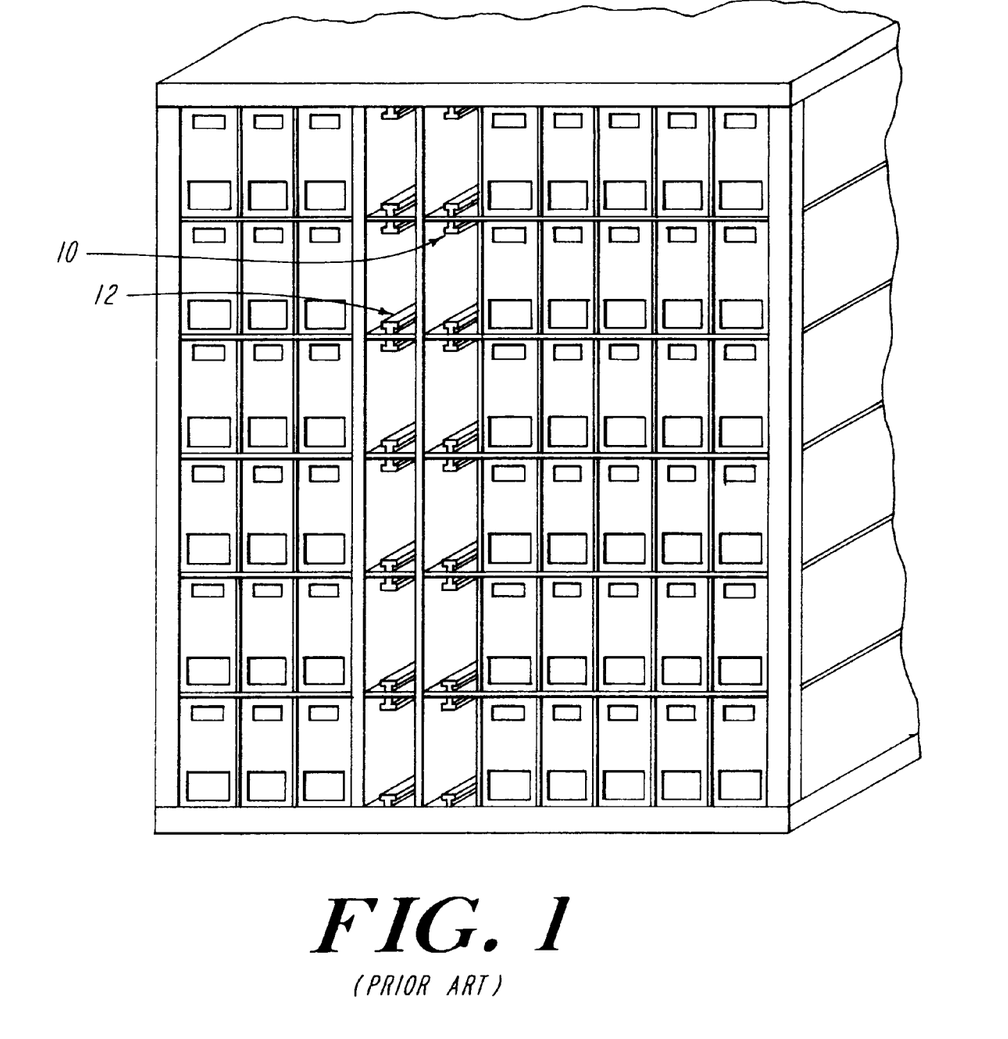
FIG. 1 is a front view of a cast rack, housing an array of hard disk drives according to the prior art.
Figure 1A:
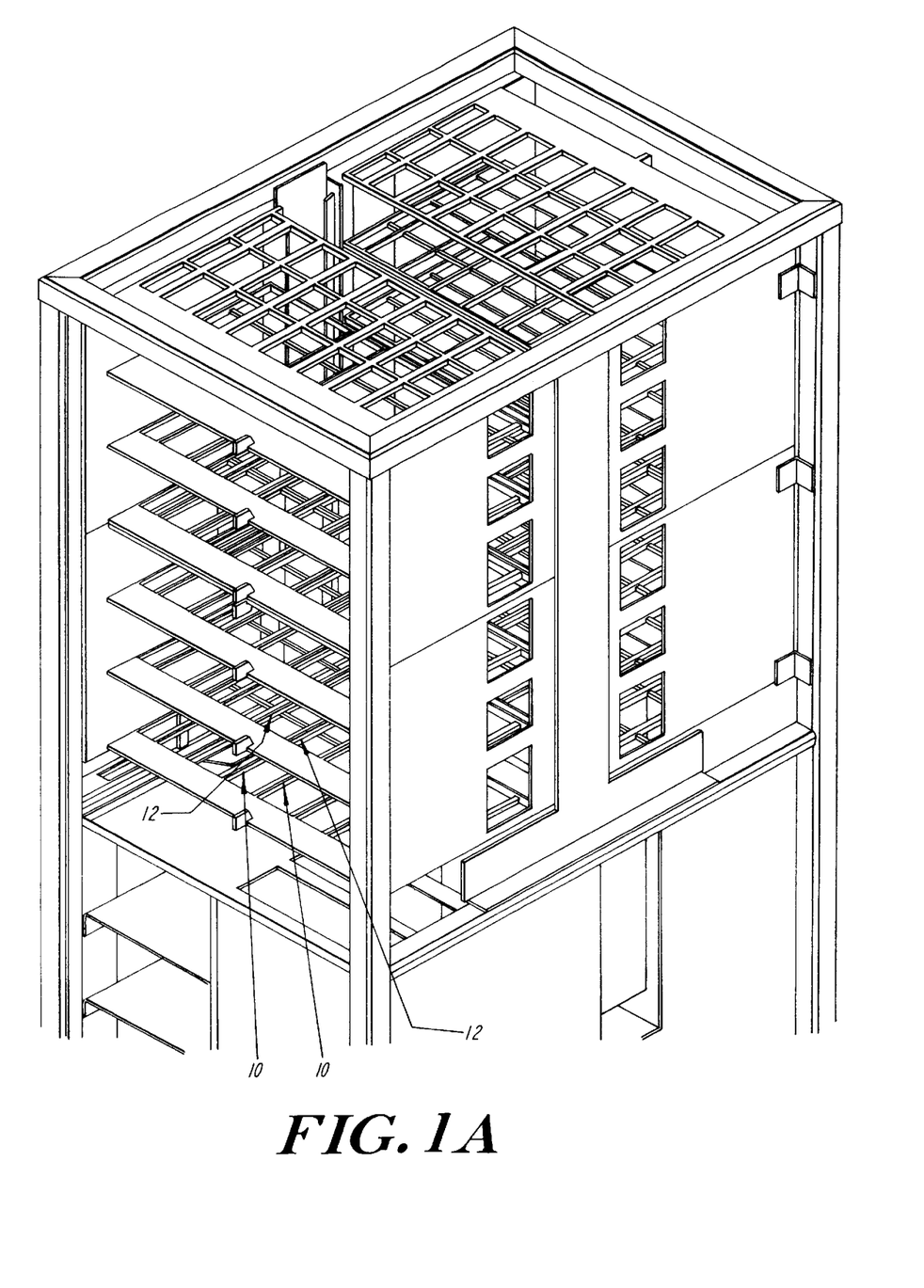
FIG. 1A is an isometric view of a cast rack of FIG. 1.

Opposite sides of each bay have a respective guide rail 10, 12 dimensioned at a length of approximately 9.5 inches, a width of approximately 0.25 inches, and a height of approximately 0.08 inches. FIG. 1 provides a view of the guide rails along which the disk carriers slide when inserted into the unit. In this illustrative embodiment the guide rails are disposed on the top and bottom of each bay. The guide rails in each bay ensure that the respective drive carrier slides into the bay in a manner that provides and maintains a stable electrical connection and fit.

Figure 2:
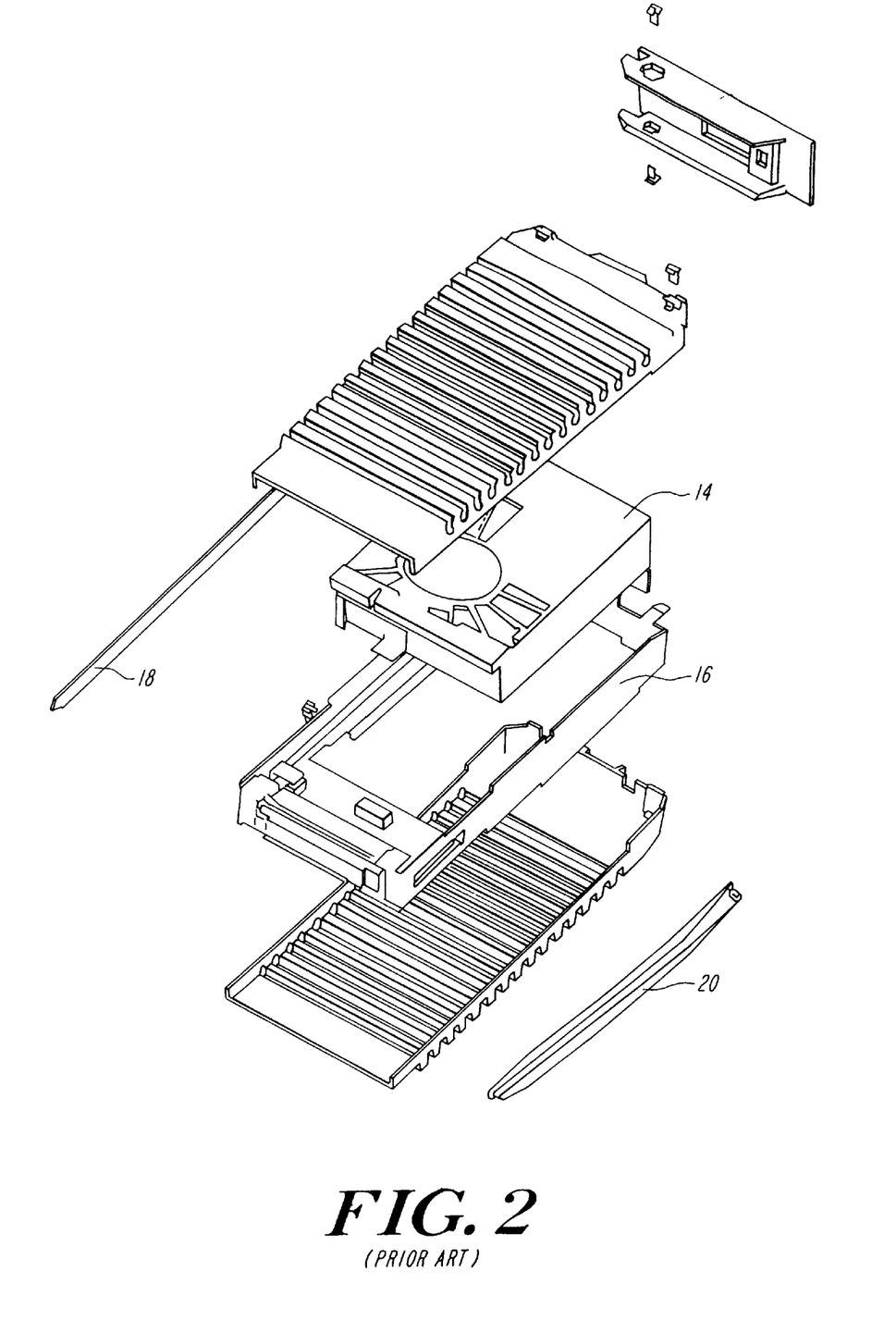
FIG. 2 is an exploded view of components of a clam-shell type drive carrier according to the prior art.

A drive carrier according to the invention is similar to the prior art drive carrier shown in FIG. 2, and consists of a clam shell drive carrier which houses the hard disk 14. The drive carrier is of a length of approximately 10.6 inches, a width of approximately 2.0 inches, and a height of approximately 4.35 inches.

Figure 3A:
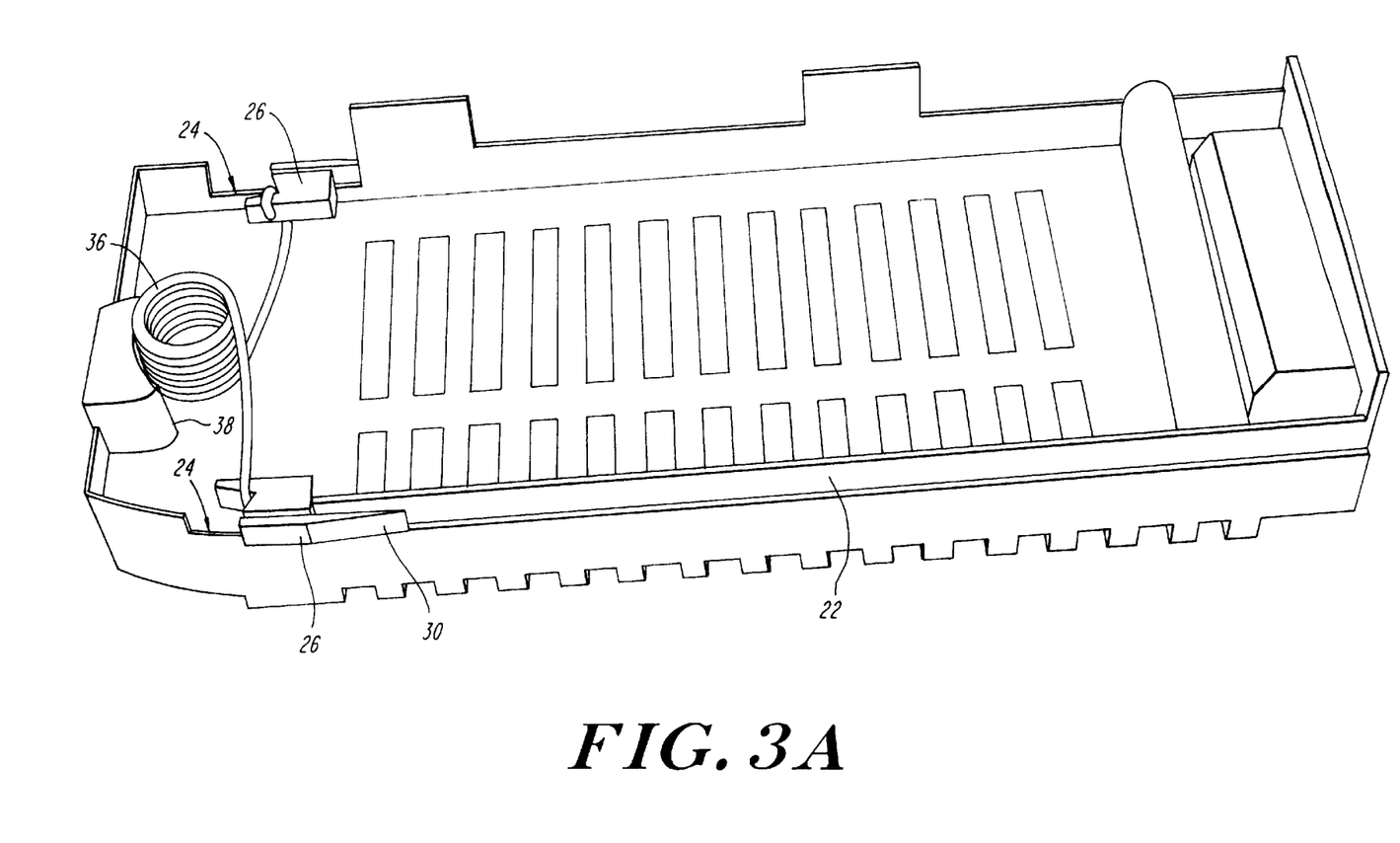
FIG. 3a is a perspective view of a vibration dampening mechanism in a clam-shell drive carrier according to the invention.

As opposed to the grooved strips 18, 20 of the prior art drive carrier, the clam shell drive carrier according to the present invention contains integral channels 22 which run along the exterior edge of one half of the drive carrier, as shown in FIG. 3a (only one side/channel shown). These integral channels 22, located on opposite sides of a half of the carrier, replace the grooved metallic strips of the prior art carrier shown in FIG. 2. Each integral channel has a depth of approximately 0.07 inches subject to a tolerance of ±0.005 inches, a width of approximately 0.25 inches, and a length of approximately 9.5 inches. They are designed to engage with the previously described guide rails contained in each bay of the cast racks.

The drive carrier according to the present invention comprises additionally four respective slide ridges 24, two located on each half of the clam shell carrier. Two slide ridges 24 are configured on the half of the drive carrier which contains the integral channel. Each slide ridge extends from the end of the integral channel to the front end of the drive carrier. Two ridges on the other half of the clam shell drive carrier (i.e., the half that does not have an integral channel), begin at the front end of that respective piece and extend towards the rear end of the carrier for a length of approximately 1.15 inches. First and second ends of each side ridge terminate in stops that limit the motion of a slidable ramp described in detail hereinafter.

The four slide ridges on the drive carrier are dimensioned to engage two substantially identical, movable, plastic ramps 26 of the vibration dampening mechanism of the present invention. Each of two opposing slide ridges, one on each piece of the drive carrier, engage a single ramp by means of two recesses 28 (best seen in FIGS. 4a and 4b), located on the ramp. The recesses 28 are dimensioned as a function of the slide ridges to receive the slide ridges therein for slidable engagement.

Each ramp includes an inclined portion 30 with a length of approximately 0.8 inches, a width of approximately 0.25 inches, and a slope configured to engage the guide rail of the cast rack. The inclined portion 30 of the ramp 26 is dimensioned with the slope selected to take up a maximum tolerance that can exist between the drive carrier integral channel and the guide rail on the cast rack. The width of the ramp is dimensioned such that the ramp slides along the slide ridges of the drive carrier into the integral channel of the carrier which in turn engages a guide rail on the cast rack. The inclined portion of each ramp effects a wedge that takes up any tolerances between the integral channel and the guide rail when the carrier is installed in the rack.

Figure 4A:
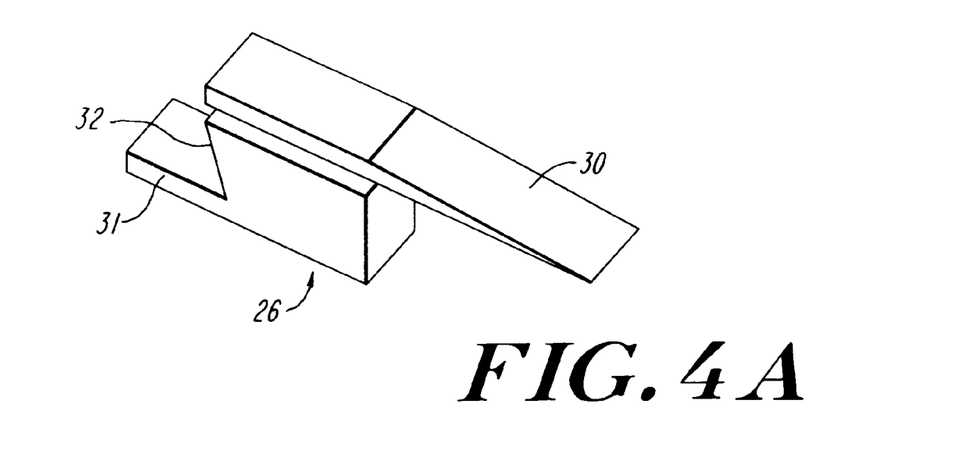
FIG. 4a is a perspective view of a movable ramp of the vibration dampening mechanism of FIGS. 3a and 3b.
Figure 4B:
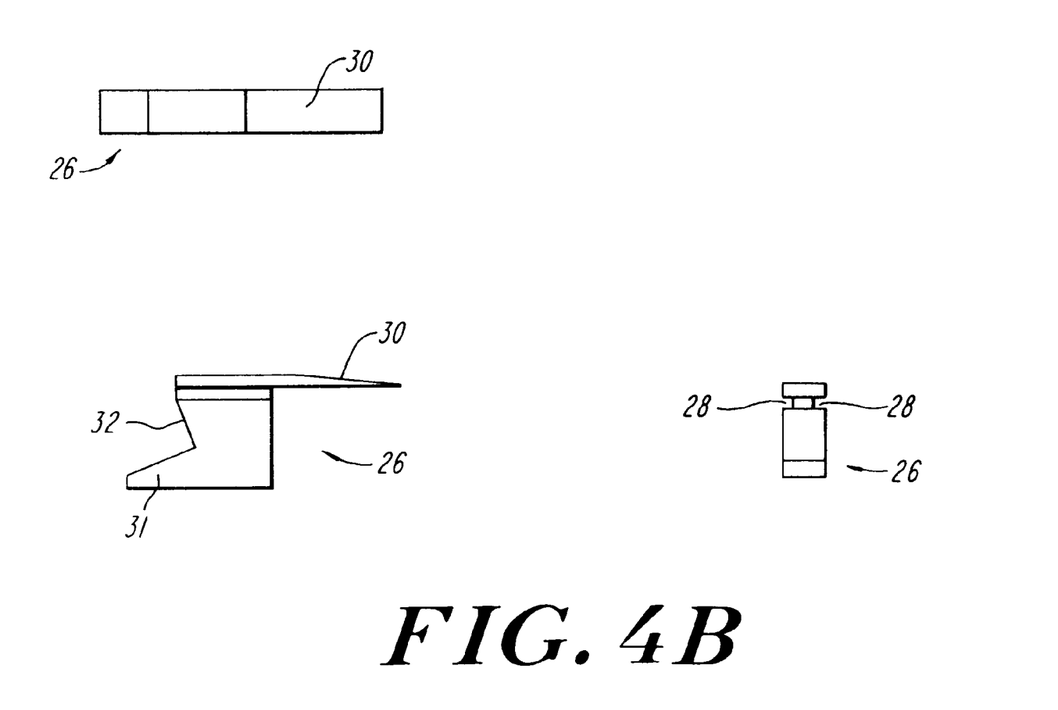

The base of each ramp contains a projection 31 with a flat surface 32 against which abuts a respective lead 34 of a torsion biasing spring 36 of the present invention. The projection, which is illustrated in FIG. 4a, has a length of approximately 0.4 inches. The flat surface 32 is at an angle of approximately 65 to 75 degrees relative to the projection 31. The angle is designed to minimize the twist on the ramp caused by the torsion biasing spring.

Figure 5A:
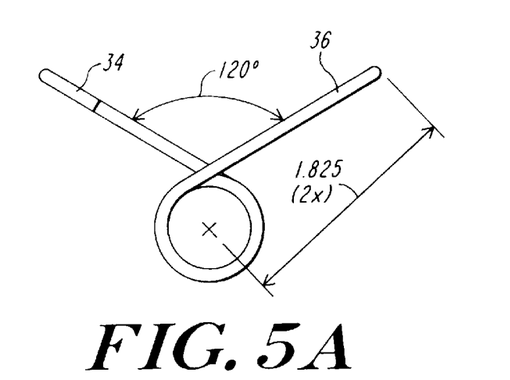
FIG. 5a and 5b are views of a torsion biasing spring of the vibration dampening mechanism according to the invention.
Figure 5B:
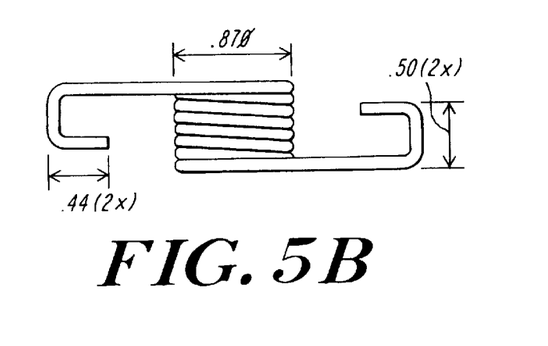

The torsion biasing spring 36 is made from stainless steel. The spring exerts a force of approximately 3–4 pounds as a function of the diameter of the spring material and the number of turns or windings. The wire diameter of the spring in this illustrative embodiment is approximately 0.09 inches. The spring has 6.5 windings and the angle between the finished leads, as illustrated in FIG. 5a, is approximately 120 degrees. In the illustrative embodiment, approximately 3 pounds of force is required to actuate the ramp(s) biased by the spring away from a first stop or abutment face on the slide ridge(s). By the end of the actuation of the ramp(s) (i.e., at a second stop or abutment surface on the slide ridge(s)), approximately 4 pounds of force is being exerted.

Figure 3B:
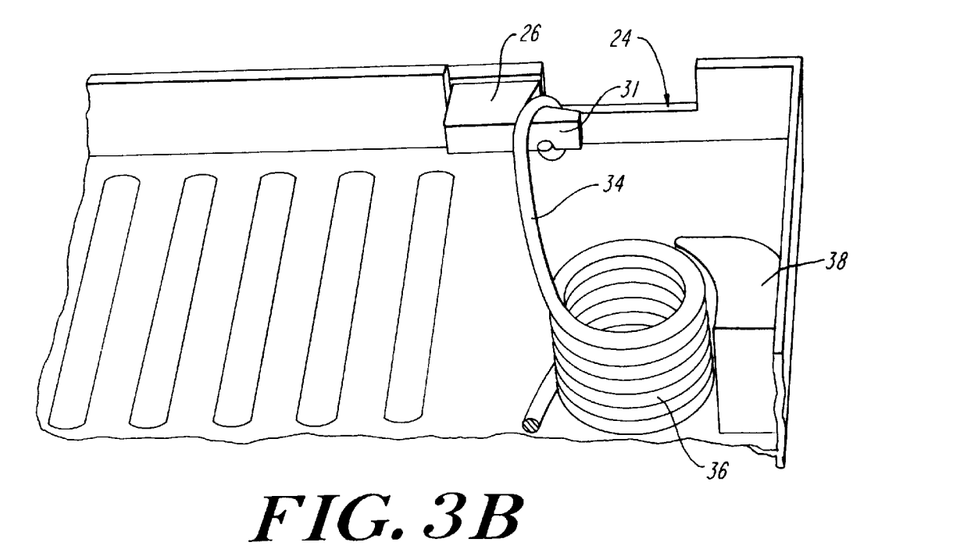

As illustrated in FIGS. 3a and 3b, the spring sits vertically and rests against a spring abutment surface 38 in the half of the clam shell drive carrier containing the integral channels. The two leads 34 from the spring 36 each extend and engage the projection 31 at the base of each movable ramp as shown in FIGS. 3a and 3b.

All the afore-mentioned components, i.e., the spring 36 and ramp(s) 26 in conjunction with the slide ridges 24, effectively work together to effectively eliminate tolerances and provide a vibration dampening mechanism. When a drive carrier containing the vibration dampening mechanism is inserted into the cast rack along the guide rails, the tolerance between the carrier and the guide rails effects an actuation of the ramp in a first direction. If the tolerance between the drive carrier and the guide rail is lower the ramp is actuated in the first direction to a greater extent. On the other hand, if the tolerance between the drive carrier and the guide rail is high, the ramp is actuated only slightly so that the ramp substantially reduces the tolerance between the carrier and the rack. The reduced tolerance resulting from the ramp(s) acting as a wedge between the carrier channel(s) and the guide rail(s) of the rack, results in a substantial vibration dampening effect. Minimization of the vibration enhances the performance of the hard drives.

Although the illustrative embodiment previously described utilizes a dual ramp system to balance vibration dampening forces, it should be appreciated that a single ramp on one side of the drive carrier could be used instead to effectively eliminate the tolerances in the rack and carrier components.

While the embodiment described utilizes a wound, torsion biasing spring, it should be appreciated that other biasing structures such as a leaf spring, compressible material structure (e.g., rubber plug) or the like can be used instead.

It should be appreciated that although a carrier and rack for purposes of housing disk drives are described having particular dimensions in the illustrative embodiment, other applications for mounting appliances in a structure requiring tolerance elimination may be suited for the vibration dampening mechanism according to the invention, and different particular dimensions of corresponding components might be indicated as a function of the application.

Similarly, it should be appreciated that although the invention is applied in an illustrative context wherein a cast rack has guide rails on the top and bottom thereof, greater or fewer numbers of guide rails may be present (e.g., only one or more than two), and they may be alternatively located, for example on the sides, corners or some combination of corners, top, bottom and sides.

While the illustrative embodiment herein described includes an integral channel on the carrier and a mating guide rail on the rack receiving the carrier, it should be appreciated that rather than an integral channel, the carrier could have other structure for engaging structure on the rack, such as corresponding rail abutment surface or the like. Likewise, the corresponding structure on the rack engaged by the vibration dampening ramp could be other than a guide rails, such as a cooperating channel, a corresponding abutment surface, or the like.

Although the invention has been shown and described with respect to exemplary embodiments thereof, various other changes, omissions and additions in the form and detail thereof may be made therein without departing from the spirit and scope of the invention.

What is claimed is:

1. A vibration dampening mechanism for dampening vibrations of a carrier installed in a rack including cooperating structure for holding said carrier, comprising:
   at least one dampening engagement structure disposed on said carrier wherein said at least one dampening engagement structure comprises a channel;
   at least one movable ramp installed on said carrier configured to engage said cooperating structure on said rack; and
   a biasing element engaging said at least one movable ramp and exerting a force on said at least one movable ramp in a position of engagement between said at least one dampening engagement structure on said carrier and said cooperating structure on said rack.

2. The vibration dampening mechanism of claim 1 wherein said at least one dampening engagement structure disposed on said carrier comprises at least one slide ridge.

3. The vibration dampening mechanism of claim 2 wherein said at least one movable ramp installed on said carrier includes at least one recess configured to engage said at least one slide ridge.

4. The vibration dampening mechanism of claim 1 wherein said channel is integral to said carrier.

5. The vibration dampening mechanism of claim 1 having at least one slide ridge comprising four substantially identical slide ridges disposed on said carrier.

6. The vibration dampening mechanism of claim 1 wherein said cooperating structure on said rack includes at least one guide rail and said at least one dampening engagement structure on said carrier includes at least one channel and said at least one movable ramp is disposed between said at least one guide rail and said at least one dampening engagement structure providing a wedge there between.

7. The vibration dampening mechanism of claim 1 wherein said biasing element engaging said at least one movable ramp comprises a torsion biasing spring.

8. The vibration dampening mechanism of claim 1 wherein and said at least one movable ramp includes at least one projection portion and said biasing element engaging said at least one movable ramp comprises a torsion biasing spring having a lead engaging said at least one projection portion of said at least one movable ramp.

9. A method of dampening vibrations in a carrier mounted in a rack, said method comprising the steps of:
   configuring said carrier to have at least one dampening engagement structure;
   installing a biasing element in said carrier;
   providing at least one movable ramp in engagement with said biasing element wherein said at least one movable ramp has at least one recess engaging said at least one slide ridge, and disposing said at least one movable ramp proximate to said channel on said carrier; and
   positioning said moveable ramp, as a function of said biasing element, between said at least one dampening engagement structure and a portion of said rack to damp vibration.

10. The method of claim 9 wherein said step of configuring said carrier to have at least one dampening engagement structure involves disposing at least one slide ridge and a channel on said carrier.

11. The method of claim 9 wherein said step of installing a biasing element in said carrier involves resting said biasing element against an abutment surface in said carrier.

12. The method of claim 9 wherein said step of installing a biasing element in said carrier involves installing a torsion biasing spring having two leads and wherein the leads of the spring each attach to a portion of said movable ramp.

13. A vibration dampening mechanism for dampening vibrations of a carrier installed in a rack including cooperating structure for holding said carrier, comprising:
   dampening means for engaging said carrier and said cooperating structure on said rack; and
   biasing means for biasing said dampening means against said carrier and said cooperating structure on said rack wherein said biasing means comprises a torsion biasing spring.

* * * * *

UNITED STATES PATENT AND TRADEMARK OFFICE
CERTIFICATE OF CORRECTION

PATENT NO. : 6,199,839 B1
DATED : March 13, 2001
INVENTOR(S) : Francis Blaise Rienzo It is certified that error appears in the above-identified patent and that said Letters Patent is hereby corrected as shown below:

Column 3,
Line 3, please delete "a"

Signed and Sealed this

Eleventh Day of December, 2001

*Attest:*

NICHOLAS P. GODICI
*Attesting Officer*    *Acting Director of the United States Patent and Trademark Office*